United States Patent [19]

Iijima

[11] 4,142,613
[45] Mar. 6, 1979

[54] DOWNSHIFT CONTROL APPARATUS FOR AUTOMATIC POWER TRANSMISSION

[75] Inventor: Tetsuya Iijima, Tokyo, Japan

[73] Assignee: Nissan Motor Company, Limited, Yokohama, Japan

[21] Appl. No.: 758,760

[22] Filed: Jan. 12, 1977

[30] Foreign Application Priority Data

Jan. 13, 1976 [JP] Japan .................................. 51/2440

[51] Int. Cl.² .......................................... B60K 41/04
[52] U.S. Cl. ..................................... 192/4 A; 74/866
[58] Field of Search ........................... 192/4 A; 74/866

[56] References Cited

U.S. PATENT DOCUMENTS

| | | | |
|---|---|---|---|
| 2,872,000 | 2/1959 | Herndon et al. | 192/4 A |
| 3,523,597 | 8/1970 | Lemieux | 192/4 A |
| 3,700,079 | 10/1972 | Shirai et al. | 192/4 A |
| 3,974,720 | 8/1976 | Iijima | 192/4 A X |

*Primary Examiner*—James F. Coan

*Attorney, Agent, or Firm*—Schwartz, Jeffery, Schwaab, Mack, Blumenthal & Koch

[57] ABSTRACT

A downshift control apparatus for biasing a shift valve of a hydraulic control system of an automatic power transmission of an automotive vehicle toward a downshift position for raising the transmission gear shift points during kickdown or sudden deceleration condition of the vehicle, featuring a downshift valve which includes a valve spool movable between a first position passing a control fluid pressure to the shift valve and a second position discharging the fluid pressure from the shift valve, wherein the valve spool is urged toward the first position by the force of a spring and a fluid pressure developed in the valve in response to a kickdown condition or a sudden deceleration condition of the vehicle and toward the second position by a fluid pressure varying with the power output of the engine and a force resulting from a fluid pressure which acts on a differential pressure-acting area of the valve spool when the valve spool is held in or moving toward the second position thereof.

13 Claims, 5 Drawing Figures

DOWNSHIFT CONTROL APPARATUS FOR AUTOMATIC POWER TRANSMISSION

The present invention relates to automatic power transmissions of automotive vehicles and, more particularly, to a downshift control apparatus for use in the hydraulic control system of an automatic power transmission of an automotive vehicle.

A downshift control arrangement incorporated in the hydraulic control system of an automatic power transmission usually comprises a downshift valve unit which is interposed between a source of fluid under line pressure and at least one transmission gear shift valve, ordinarily a parallel combination of two or more shift valves. The shift valve or each of the shift valves has an upshift position and a downshift position and is operated between the two positions by a fluid under throttle-valve pressure which is continuously variable with the power output of the engine and a fluid under governor-valve pressure which is continuously variable with the road speed of the vehicle higher than a predetermined value, as well as by the line-pressure fluid, as is well known in the art. The downshift valve unit has a first condition operative to pass the line-pressure fluid therethrough to the shift valve or to each of the shift valves and a second condition to cut off the flow of the line-pressure fluid therethrough and is operated, in either electrical or mechanical fashion, between these two conditions in response to preselected operational conditions of the vehicle. In some of the downshift control arrangements which have thus far been put into use, such operational conditions include a kickdown condition which is produced when the accelerator pedal is depressed all the way down to establish a full throttle condition in the engine and a sudden deceleration condition which is produced when the brake pedal of the vehicle is depressed during cruising of the vehicle. During kickdown or sudden deceleration condition of the vehicle, the downshift valve unit is actuated into the first condition so that the shift valve or each of the shift valves is biased toward the downshift position thereof and raises the transmission gear shift points which are usually measured in terms of the road speed of the vehicle or the rotational speed of the engine output shaft. Among the downshift control arrangements of this type is an arrangement which uses a downshift valve unit designed to be capable of maintaining the first condition, i.e. the downshift condition after the brake pedal is released, unless the accelerator pedal is depressed from the released position thereof. Such a downshift control arrangement is disclosed in, for example, applicant's copending Japanese Patent Application No. 50-135,024.

The downshift valve unit shown in Japanese Patent Application No. 50-135,024 comprises a valve spool which is slidably mounted in a valve chamber cast in the transmission casing and which is movable between first and second axial positions establishing the above mentioned first and second conditons, respectively, in the downshift valve unit. When the brake pedal is depressed or the accelerator pedal is depressed throughout the full stroke thereof, the downshift valve unit is actuated to have the valve spool moved into the first axial position thereof and produces a transmission gear shiftown. When, on the other hand, the brake pedal is kept released and the engine is operating in part-throttle condition, then the downshift valve unit is held in the condition having the valve spool in the above mentioned second axial position thereof so that the shift valve or each of the shift valves is controlled to operate independently of the downshift valve unit. If the engine is operating in idling condition with the brake pedal kept released, the valve spool of the downshift valve unit is maintained in the first axial position thereof and holds the shift valve or each of the shift valves in the downshift position thereof. In the downshift valve unit thus arranged, it is by virtue of the frictional force established between the valve spool and the transmission casing supporting the valve spool which is effective to cause the valve spool to stay in the first axial position thereof. The valve spool held in the first axial position thereof is thus subject to undue or irregular motion by shocks and vibrations imparted thereto and may create an erroneous motion or hunting of the shift valve of each of the shift valves.

Such a problem may be solved by designing the valve spool and the valve chamber in such a manner as to produce an increased frictional force between the valve spool and the transmission casing formed with the valve chamber. The increased frictional force exerted on the valve spool would, however, spoil the responsiveness of the valve spool to the fluid pressures acting thereon and deteriorates the smoothness of the movement of the valve spool. If, furthermore, the downshift valve unit is provided with a solenoid-operated valve actuator which is arranged to be responsive to the movements of the accelerator and brake pedals, such an actuator must be designed to be capable of producing a driving force which is sufficient to overcome any opposing force or forces such as the force resulting from the throttle-valve pressure acting on the valve spool when moving the valve spool from the second axial position back into the second position during a kickdown condition in which the throttle-valve pressure usually peaks up. The solenoid-operated valve actuator having such a capability will inevitably have a disproportionally large-sized construction and will consume a disproportionally large amount of electric energy, giving rise to an increase in the costs for production and maintenance of the power transmission as a whole. The present invention contemplates elimination of all these drawbacks that have been inherent in conventional downshift control arrangements of the described character.

It is, accordingly, an important object of the present invention to provide an improved downshift control apparatus for use in the hydraulic control system of an automatic power transmission wherein the downshift control apparatus is free from undue or erroneous motion and can therefore be operated between the kickdown and non-kickdown conditions with certainty.

It is another important object of the present invention to provide an improved downshift control apparatus of the type using a valve spool wherein the valve spool is moved between the kickdown and non-kickdown positions by forces which are positively applied to the valve spool, viz., by forces other than the frictional force established between the valve spool and a wall portion of the transmission casing into which the valve chamber is cast to accommodate the axial movement of the valve spool.

It is still another important object of the present invention to provide an improved downshift control apparatus using servo means by which the valve spool in the downshift valve means forming part of the control apparatus is moved forcefully and with certainty into the kickdown position thereof by application of a small mechanical force to the valve means.

Yet, it is still another important object of the present invention to provide an improved downshift control apparatus which is sufficiently small in construction and which is easy and economical to manufacture and to operate.

In accordance with a basic aspect of the present invention, there is provided, in an automotive vehicle having engine power output control means capable of producing a kickdown condition, braking means capable of producing a sudden deceleration condition of the vehicle and automatic power transmission including a hydraulic control system which includes a source of control fluid pressure and at least one transmission gear shift valve having an upshift position and downshift position, a downshift control apparatus for biasing the shift valve toward the downshift position thereof during a kickdown condition or a sudden deceleration condition of the vehicle, the downshift control apparatus comprising downshift valve means intervening between the source of the control fluid pressure and the shift valve and having a first condition operative to pass the control fluid pressure therethrough to the shift valve for urging the shift valve toward the downshift position thereof and a second condition operative to discharge the control fluid pressure from the shift valve through the valve means, first biasing means urging the downshift valve means toward the first condition thereof by a substantially constant force, second biasing means responsive to the variation in the power output of the engine for urging the downshift valve means toward the second condition thereof, third biasing means operative to urge the downshift valve means toward the second condition thereof when the valve means is out of the first condition thereof, and servo means responsive to a kickdown condition and a sudden deceleration condition of the vehicle for driving, jointly with the force exerted on the valve means by the first biasing means, the downshift valve means out of the second condition into the first condition thereof against the forces exerted on the valve means by the second and third biasing means in response to a kickdown condition or a sudden deceleration condition of the vehicle. The servomeans is, preferably, so arranged as to be operative to produce a hydraulic power output acting on the valve means in response to a kickdown condition or a sudden deceleration condition of the vehicle. In this instance, the servo means may comprise a fluid circuit having a first condition to develop a fluid pressure as the aforesaid power output of the servo means and a second condition to discharge the fluid pressure from the fluid circuit and a solenoid-operated actuator for actuating the fluid circuit into the first condition thereof in response to a kickdown condition or a sudden deceleration condition of the vehicle. In this instance, the fluid circuit may comprise a flow restriction in constant communication with the source of the control fluid pressure and a fluid discharge port in constant communication with the source through the flow restriction and larger in open cross-sectional area than the flow restriction, the solenoid-operated actuator being operative to close the fluid discharge port developing the fluid pressure at the hydraulic power output of the servo means and in response to a kickdown condition or a sudden deceleration condition of the vehicle and to allow the fluid discharge port to open for discharging the fluid pressure from the fluid circuit through the fluid discharge port in the absence of a kickdown condition and a sudden deceleration condition of the vehicle. The above mentioned control fluid pressure is preferably a line pressure which is ordinarily utilized as a basic control fluid pressure in hydraulic control systems of automatic power transmissions.

In accordance with a more specific aspect of the present invention, there is provided, in an automotive vehicle having engine power output control means capable of producing a kickdown condition, braking means capable of producing a sudden deceleration condition of the vehicle and an automatic power transmission including a hydraulic control system which includes a source of line pressure, an engine-output responsive valve responsive to the operation condition of the engine power output control means and at least one transmission gear shift valve having an upshift position and a downshift position, a downshift control apparatus for biasing the shift valve toward the downshift position thereof during a kickdown condition or a sudden deceleration condition of the vehicle, the downshift control apparatus comprising downshift valve means intervening between the source of the line pressure and the shift valve and having a first condition operative to pass the line pressure therethrough to the shift valve for urging the shift valve toward the downshift position thereof and a second condition operative to discharge the line pressure from the shift valve through the valve means, first biasing means urging the downshift valve means toward the first condition by a substantially constant force, second biasing means responsive to the throttle-valve pressure delivered from the engine-output responsive valve for urging the downshift valve means toward the second condition thereof, third biasing means responsive to the line pressure and operative to urge the downshift valve means toward the second condition thereof when the valve means is out of the first condition thereof, and servo means responsive to a kick-down condition and a sudden deceleration condition of the vehicle for producing a hydraulic power output which is effective, jointly with the force exerted on the valve means by the first biasing means, to drive the downshift valve means out of the second condition into the first condition thereof against the force exerted on the valve means by the second and third biasing means in response to a kickdown condition or a sudden deceleration condition of the vehicle.

The features and advantages of the downshift control apparatus according to the present invention will be more clearly understood from the following description taken in conjunction with the accompanying drawings, in which.

Figure 2:
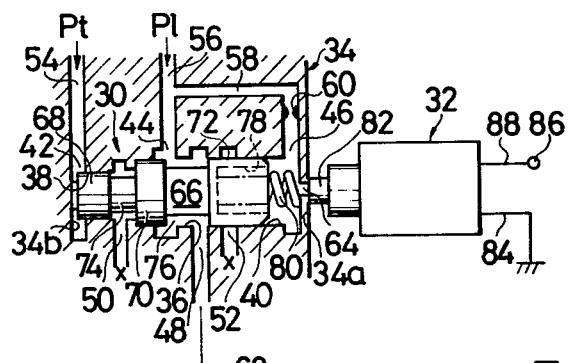
FIG. 2 is a sectional view, partly in side elevation, of a downshift valve and actuator arrangement forming part of the embodiment of the present invention, wherein the downshift valve and actuator arrangement is shown to be in a downshift conditon.
Figure 3:
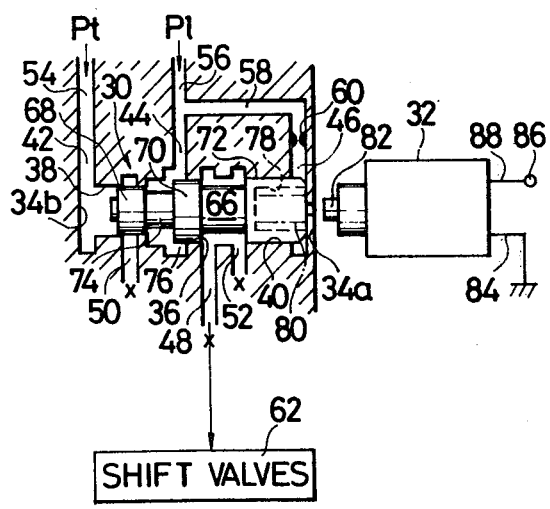
FIG. 3 is a view similar to FIG. 2 but shows the downshift valve and actuator arrangement in a non-downshift condition.
Figure 4:
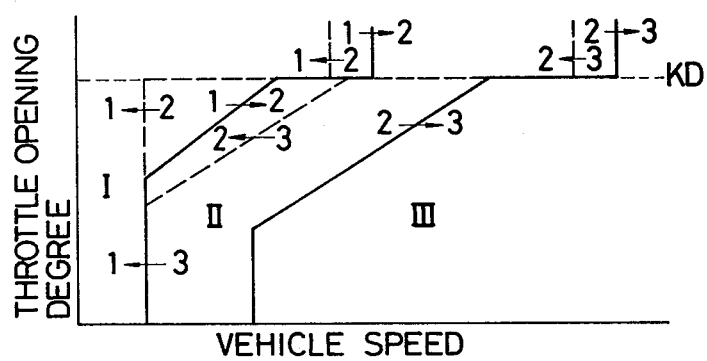
Figure 5:
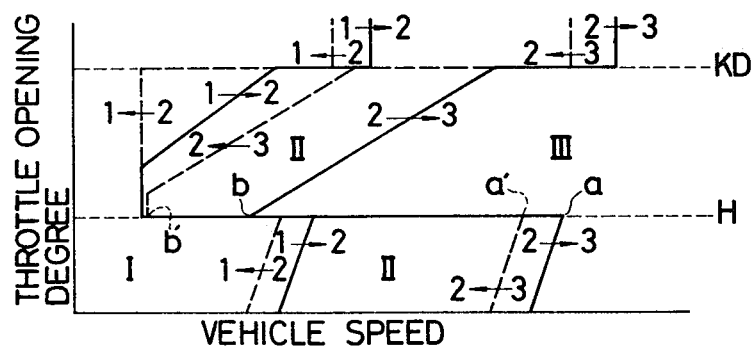

FIG. 4 is a diagram showing examples of the transmission gear upshift patterns (indicated by full lines) and downshift patterns (indicated by broken lines) which are achieved by first-second and second-third gear shift valves of a three-forward-speed automatic power transmission when the shift valves are operated independently of the downshift control apparatus embodying the present invention, viz., when the downshift valve and actuator arrangement is held in the inoperative condition illustrated in FIG. 3 in the automatic drive range of the power transmission; and FIG. 5 is a diagram similar to FIG. 4 but shows examples of the upshift and downshift patterns (indicated by full and broken lines, respectively) which are achieved by the first-second and second-third gear shift valves when the shift valves are operated by means of the downshift control apparatus embodying the present invention with the downshift valve and actuator arrangement held in the condition illustrated in FIG. 2.

Figure 1:
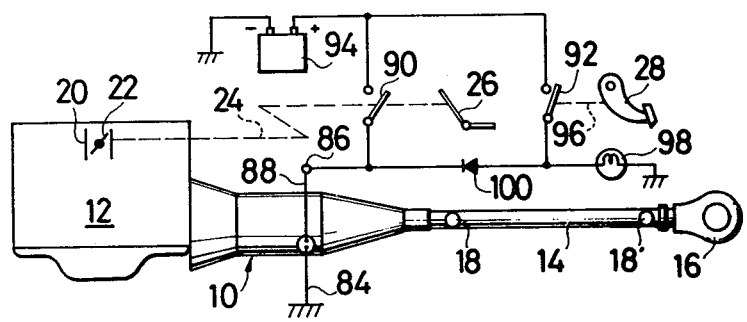
FIG. 1 is a schematic view, partly in side elevation, of an automotive power train incorporating a preferred embodiment of the downshift control apparatus according to the present invention.

Referring first to FIG. 1 of the drawings, and automatic power transmission 10 of an automatic vehicle has a hydrodynamic tongue converter (not shown) having a driven member connected to the output shaft (not shown) of an internal combustion engine 12 and carries the rotary motion of the engine crankshaft to the road wheels (not shown) of the vehicle through a final drive unit consisting of a propeller shaft 14, a differential mechanism 16 and wheel axles (not shown), as is customary. Designated by 18 and 18' are front and rear universal joints by which the propeller shaft 14 is connected at its foremost and rearmost ends to the output shaft (not shown) of the power transmission 10 and to the differential 16, respectively. The power transmission 10 is herein assumed, by way of example, to be of the three-forward-speed design which is shown in, for example, U.S. Pat. No. 3,561,295 patented Feb. 9, 1971 but may be of any other design which is presently in use or known. The internal combustion engine 12 is provided with a carburetor 20 having a carburetor throttle valve 22 which is rotatable between a full throttle position and a fully closed position (which actually is slightly open as is well known in the art) through a part-throttle position. The carburetor throttle valve 22 is connected by a suitable mechanical linkage 24 to an accelerator pedal 26 and is moved into any of the above mentioned positions thereof depending upon the position of the accelerator pedal 26. When the accelerator pedal 26 is released, the carburetor throttle valve 22 is moved into the fully closed position and the throttle valve 22 allows the combustible mixture of air and fuel to flow past the valve at a limited rate. Under these conditions, the cylinders of the engine 12 are supplied with extremely small quantities of combustible charges and the engine operates in idling condition delivering substantially no power output to the power transmission 10. When, on the other hand, the accelerator pedal 26 is depressed all the way down, then the carburetor throttle valve 22 is moved into the full throttle position and passes the air-fuel mixture at a maximum rate to the cylinders (not shown) of the engine 12, which accordingly delivers a maximum power output to the power transmission 10. The power output of the engine 12 is, thus, dictated by the angular position of the throttle valve 22 in the carburetor 20 and accordingly by the position of the accelerator pedal 26. When the opening degree of the carburetor throttle valve 22 is varied and as a consequence the flow rate of the air-fuel mixture through the carburetor 20 is varied, the suction developed in the intake manifold of the engine or, in other words, downstream of the throttle valve 22 continuously varies. The suction in the intake manifold of the engine 12 is, thus, a faithful representation of the power output delivered from the engine 12, as is well known in the art.

The power transmission 10, which is also well known in the art, has a hydraulic control system including therein a parallel combination of transmission gear shift valves (not shown) which are herein assumed to consist of first-second and second-third shift valves. Though not shown, each of the shift valves is provided with a plurality of fluid inlet ports which are in communication constantly or across other suitable valve means with a source of a line-pressure fluid, an engine-output responsive valve usually called a transmission throttle valve and a vehicle-speed responsive valve usually called a governor valve by way of various fluid lines. The source of the linepressure fluid is largely constituted by an engine driven fluid feed pump and a pressure regulator valve communicating with the above mentioned transmission throttle valve and produces a line pressure Pl which is used as a basic fluid pressure in the hydraulic control system of the power transmission 10. On the other hand, the transmission throttle valve is acted upon by the above mentioned suction developed in the intake manifold of the engine and produces a throttlevalve pressure Pt which is continuously variable with the suction in the intake manifold and accordingly with the power output of the engine 12. The governor valve is splined to the output shaft (not shown) of the power transmission 10 and is composed of a primary valve unit adapted to the open in response to the rotational speed of the transmission output shaft higher than a predetermined limit and a secondary valve unit adapted to develop a governor-valve pressure which is continuously variable with the rotational speed of the transmission output shaft. The primary and secondary valve units are connected in series with each other so that the governor valve as a whole is operative to deliver a governor-valve pressure which is representative of the road speed of the vehicle higher than a predetermined level. Since the construction and operation of the transmission throttle valve and the governor valve thus arranged are well known in the art and are rather immaterial to the understanding of the gist of the present invention, further details thereof will not be herein described.

Under usual operating conditions of the automotive vehicle, the shift valves in the hydraulic control system of the power transmission 10 are operated on the line pressure, throttle-valve pressure and governor pressure which are produced in the above described fashion. Upshifts and downshifts between the three forward drive gear positions in the automatic drive range of the power transmission 10 are thus made depending upon the power output of the engine and the road speed of the vehicle alone under the above described operating conditions of the vehicle. The downshift control apparatus proposed by the present invention is intended to have the shift valves biased toward the downshift positions thereof and to thereby shift the transmission gear shift points to higher levels during predetermined conditions of the vehicle, viz., a kickdown condition in which the accelerator pedal 26 is fully depressed to produce the full throttle condition in the carburetor 20 of the engine 12 and a sudden deceleration condition which is created when a brake pedal shown at 28 in FIG. 1 is depressed during cruising of the vehicle.

Referring to FIGS. 2 and 3 as well as to FIG. 1 of the drawings, the downshift control apparatus embodying the present invention comprises a downshift valve unit 30 and a solenoid-operated valve actuator 32. The downshift valve unit 30 comprises a valve casing 34 which forms part of the casing structure of the power transmission 10. The valve casing 34 is formed with a generally cylindrical valve chamber 36 consisting of a first bore portion 38 which is open at one axial end thereof and a second bore portion 40 which has one end open at the other end of the first axial bore portion 38 and which has the other axial end at the inner face of a flat wall portion 34a of the valve casing 34. The first axial bore portion 38 is smaller diameter than the second axial bore portion 40. The valve casing 34 is further formed with first, second and third fluid inlet ports 42, 44 and 46, a fluid outlet port 48 and first and second drain ports 50 and 52. The first fluid inlet port 42 is open at the open axial end of the first axial bore portion 38 of the valve chamber 36 and is in constant communication with fluid outlet port of the previously mentioned transmission throttle valve (not shown) through a passageway 54 so that the throttle-valve pressure Pt is always developed in the first fluid inlet port 42. The second fluid inlet port 44 is open to the second axial bore portion 40 and is located close to the meeting ends of the first and second axial bore portions 38 and 40, as shown. The second fluid inlet port 44 is in constant communication with the fluid outlet port of the previously mentioned source of the line-pressure fluid through a passageway 56 so that the line pressure Pl is constantly developed in the second fluid inlet port 44. The third fluid inlet port 46 is open at the axial end of the second axial bore portion 40 defined by the inner face of the above mentioned flat wall portion 34a of the valve casing 34. The third fluid inlet port 46 communicates by way of a passageway 58 with the above mentioned passageway 56 leading from the second fluid inlet port 44. A flow restriction constituted by a calibrated orifice 60 is provided in the passageway 58 thus extending between the passageway 56 and the third fluid inlet port 46. The fluid outlet port 48 is open to the second axial bore portion 40 of the valve chamber 36 between the second and third fluid inlet ports 46 and 48 and is in constant communication with one of the fluid inlet ports (not shown) of each of the transmission gear shift valves which are diagrammatically indicated by 62 in FIGS. 2 and 3. The first drain port 50 is open to the first axial bore portion 38 of the valve chamber 36, while the second drain port 52 is open to the second axial bore portion 40 of the valve chamber 36 between the fluid outlet port 48 and the third fluid inlet port 46 as shown. The drain ports 50 and 52 are in communication with a sump (not shown) for recirculating the exhaust fluid to the fluid feed pump. The flat wall portion 34a of the valve casing 34 is formed with an aperture 64 which is open at the outer face of the wall portion 34. The aperture 64 has an open cross sectional area which is larger than the open cross sectional area of the orifice 60 in the passageway 58 leading from the third fluid inlet port 46. The aperture 64 serves as a fluid discharge port through which the fluid entering the valve chamber 36 through the orifice 60 is discharged when the aperture 64 is open.

The downshift valve unit 30 further comprises a valve spool 66 which has a first land 68 axially slidable in the first axial bore portion 38 of the valve chamber 36 and second and third lands 70 and 72 which are axially slidable in the second axial bore portion 40 of the valve chamber 36. The second and third lands 70 and 72 have diameters which are substantially equal to each other and which are larger than the diameter of the first land 68. The lands 68, 70 and 72 are axially spaced apart from each other with the second land 70 located between the first and third lands 68 and 72 and have a first circumferential groove 74 formed between the first and second lands 68 and 70 and a second circumferential groove 76 formed between the second and third lands 70 and 72, as shown. The valve spool 66 thus configured is axially movable in the valve chamber 36 between a first axial position having the first land 68 projecting into the first fluid inlet port 42 and contacted by a wall portion 34b of the valve casing 34 defining the first fluid inlet port 46 and the third land 72 axially spaced apart a maximum distance from the inner face of the previously mentioned flat wall portion 34a of the valve casing 34 as illustrated in FIG. 2 and a second axial position having the first land 68 axially spaced apart of maximum distance from the above mentioned wall portion 34b of the valve casing 34 and the third land 72 in contact with the inner face of the wall portion 34a of the valve casing 34 as illustrated in FIG. 3. The ports 42, 44, 46, 48, 50 and 52 in the valve casing 34 and the lands 68, 70 and 72 of the valve spool 66 are located and/or sized with respect to each other in such a manner that communication is provided between the second fluid inlet port 44 and the fluid outlet port 48 through the second circumferential groove 76 between the second and third lands 70 and 72 and at the same time the second drain port 52 is covered and closed by the third land 72 when the valve spool 66 is in the first axial position thereof as shown in FIG. 2 and, furthermore, the second land 70 of the valve spool 66 is located between the second fluid inlet port 44 and the fluid outlet port 48 and thus interrupts the communication between the ports 44 and 48 and at the same time communication is provided between the fluid outlet port 48 and the second drain port 52 through the second circumferential groove 76 between the second and third lands 70 and 72 when the valve spool 66 is in the second axial position thereof as shown in FIG. 3. The first drain port 50 is adapted to allow the line-pressure fluid to withdraw from the first circumferential groove 76 between the first and second lands 68 and 70 when the valve spool 66 is being moved from the second axial position toward the first axial position thereof and accordingly the circumferential groove 74 is being moved from the second axial bore position 40 into the first axial bore portion 38 of the valve chamber 36. The third land 62 of the valve spool 66 is open at the outer axial end of the land 72. A preloaded helical compression spring 80 is seated at one end of the inner face of the flat wall portion 34a of the valve casing 34 and at the other end on the bottom face of the third land 72 thus formed with the cavity 78 so that the valve spool 66 is urged in its entirety toward the first axial position thereof illustrated in FIG. 2.

The solenoid-operated valve actuator 32 is fixedly positioned in front of the outer face of the flat wall portion 34a of the valve casing 34 and has a plunger 82 projecting toward and in line with the aperture 64 in the wall portion 34a. The plunger 82 is axially movable between a foremost axial position having its leading end in contact with the outer face of the wall portion 34a and thereby closing the aperture 64 and a rearmost axial position spaced apart from the outer face of the wall portion 34a and accordingly allowing the aperture 64 to open. The plunger 82 is urged to move toward the second axial position thereof by suitable biasing means (not shown) incorporated into the valve actuator 32. The valve actuator 32 further comprises a solenoid coil (not shown) which is connected at one end to ground by a line 84 and at the other end to an input terminal 86 by a line 88 as shown in FIGS. 2 and 3. The plunger 82 is thus moved from the second axial position into the first axial position thereof against the opposing force of the above mentioned biasing means provided in the valve actuator 32.

As is seen in FIG. 1, the input terminal 86 of the solenoid-operated valve actuator 32 is connected across a parallel combination of first and second two-position switches 90 and 92 to a d.c. power source 94 the negative terminal of which is connected to ground. The d.c. power source 94 may be constituted by a storage battery incorporated in the ignition system of the internal combustion engine 12. The first two-position switch 90 is mechanically connected to the accelerator pedal 26 by the previously mentioned linkage 24 interconnecting the accelerator pedal 26 and the throttle valve 22 of the carburetor 20 and is arranged to close when the accelerator pedal 26 is depressed throughout the full stroke thereof. The first two-position switch 90 is thus adapted to close during a kickdown condition in which the power output of the engine 12 peaks up. If desired, the switch 90 may be connected to the accelerator pedal 26 by a mechanical linkage (not shown) which is independent of the linkage 24. On the other hand, the second two-position switch 92 is connected to the brake pedal 28 by a mechanical linkage 96 and is arranged to close when the brake pedal 28 is depressed. Thus, the second two-position switch 92 is adapted to close during a sudden deceleration condition of the vehicle. By preference, a brake indicator lamp 98 may be provided which has its filament connected at one end to ground and at the other end to the d.c. power source 94 across the second two-position switch 92. The lamp 98 is thus caused to glow when the brake pedal 28 is depressed and the brakes are applied to the road wheels. Between the first two-position switch 90 and the brake indicator lamp 98 is provided a diode 100 which has its cathode terminal connected to the first two-position switch 90 and its anode terminal connected to the lamp 98 for precluding the lamp 98 from being energized when the first two-position switch 90 is closed in response to a kickdown condition created by fully depressing the accelerator pedal 90 with the brake pedal 28 kept released. It is apparent that the diode 100 need not be provided if the brake indicator lamp 98 is not used.

When, in operation, either the accelerator pedal 26 is depressed throughout the full stroke thereof or the brake pedal 28 is depressed so that either the first two-position switch 90 or the second two-position switch 92 is closed, the solenoid coil of the valve actuator 32 is energized from the d.c. power source 94 through the switch 90 or 92 and causes the plunger 82 to project into the first axial position thereof, closing the aperture 64 in the flat wall portion 34a of the valve casing 34. Under these conditions, the linepressure fluid which has been directed into the passageway 58 is passed through the orifice 60 and the third fluid inlet port 46 into the second axial bore portion 40 of the valve chamber 36 and develops in the second axial bore portion 40 a line pressure Pl which acts on the third land 72 of valve spool 66 and which urges the valve spool 66 to axially move away from the inner face of the wall portion 34a of the valve casing 34 in cooperation with the biasing force of the preloaded compression spring 80. The valve spool 66 is therefore moved into and held in the first axial position thereof and establishes fluid communication between the second fluid inlet port 44 and the fluid outlet port 48 through the second circumferential groove 76 in the valve spool 66 as shown in FIG. 2. If, in this instance, the respective cross sectional areas of the first land 68 and each of the second and third lands 70 and 72 of the valve spool 66 are represented by $S_1$ and $S_2$ and the biasing force of the preloaded compression spring 80 is denoted by F, then the valve spool 66 is urged to stay in the first axial position thereof by the sum of the force F of the compression spring 80 and the force $S_2.Pl$ resulting from the line pressure Pl which acts on the third land 72 of the valve spool 66 from the third fluid inlet port 46. The line pressure Pl also acts on the annular end faces of the second and third lands 70 and 72 of the valve spool 66 from the line-pressure fluid obtaining in the second circumferential groove 76 in the valve spool 66. The forces thus exerted on the second and third lands 70 and 72 by the fluid in the second circumferential groove 76 are, however, cancelled by each other because the lands 70 and 72 have equal cross sectional areas $S_2$. The combined forces urging the valve spool 66 to stay in the first axial position as above described are opposed by the force $S_1.Pt$ resulting from the throttle-valve pressure Pt which acts on the end face of the first land 68 of the valve spool 68 from the first fluid inlet port 42. In order to enable the valve spool 66 to stay in the first axial position thereof assuredly during kickdown or sudden deceleration condition of the vehicle, it is thus important that the sum of the force F and the force $S_2.Pl$ which are effective to urge the valve spool toward the first axial position thereof be greater than the force $S_1.Pt$ which is effective to urge the valve spool 66 toward the second axial position thereof when the valve spool 66 is in the first axial position thereof even in such a condition that the throttle-valve pressure Pt may be increased to a level approximating the line pressure Pl as in a kickdown condition in which the engine power output peaks up. This can be readily realized by properly selecting the relationship amongst the diameters of the lands 68, 70 and 72 and the force F of the preloaded compression spring 80 in consideration of the line and throttlevalve pressures Pl and Pt, especially the throttlevalve pressure Pt which is augmented toward the level of the line pressure Pl during kickdown condition. The compression spring 80 thus constitutes the previously mentioned first biasing means, and the first land 68 and the first fluid inlet port 42 constitute in combination the previously mentioned second biasing means.

When fluid communication is in this fashion established between the second fluid inlet port 44 and the fluid outlet port 48 in the downshift valve unit 30 as illustrated in FIG. 2, the line-pressure fluid which has been directed into the passageway 56 is passed through the second fluid inlet port 44, second circumferential groove 76 and fluid outlet port 48 to one of the fluid inlet ports of each of the transmission gear shift valves 62. The shift valves 62 are consequently urged toward the downshift positions thereof and raise the transmission gear shift points (which are herein assumed to be expressed in terms of vehicle speed).

When both of the first and second two-position switches 90 and 92 are open with the accelerator pedal 26 kept released or partially depressed and concurrently with the brake pedal 28 kept released, the solenoid-operated valve actuator 32 is de-energized and causes the plunger 82 to retract from the foremost axial position contacting the outer face of the wall portion 34a of the valve casing 34. The aperture 64 in the wall portion 34a of the valve casing 34 is now allowed to be open so that the line-pressure fluid entering the second axial bore portion 40 of the valve chamber 36 through the third fluid inlet port 46 is discharged through the aperture 64. The open cross sectional area of the aperture 64 being larger than the open cross sectional area of the orifice 60 in the passageway 58 leading to the third fluid inlet port 46 as previously noted, substantially no fluid pressure is developed between the third land 72 of the valve spool 66 and the inner face of the wall portion 34a of the valve casing 34 when the line-pressure fluid is thus being discharged through the aperture 64. As a consequence, the previously described relationship between the forces which have been exerted on the valve spool 66 is upset in the absence of the fluid pressure acting on the third land 72 of the valve spool 66 from the third fluid inlet port 46. If, in this instance, the solenoid-operated valve actuator 32 has been de-energized subsequently to a kickdown condition in which the engine power output was temporarily increased toward the maximum level, the throttle-valve pressure Pt remains at a relatively high level and, for this reason, the force F of the preloaded compression spring 80 urging the valve spool 66 toward the first axial position thereof is overcome by the force $S_1.Pt$ resulting from the throttle-valve pressure Pt which acts on the end face of the third land 68 of the valve spool 66. The valve spool 66 is accordingly moved from the first axial position toward the second axial position thereof. If, however, the solenoid-operated valve actuator 32 has been de-energized in the wake of a sudden deceleration condition created by depressing the brake pedal 28, then the throttle-valve pressure Pt is maintained at a relatively low level and is unable to overcome the opposing force F of the preloaded compression spring 80. Under these conditions, the valve spool 66 is maintained in the first axial position thereof until the accelerator pedal 26 is depressed to raise the power output of the engine and accordingly the throttle-valve pressure Pt, as will be more clearly described later.

When the valve spool 66 reaches the second axial position thereof as illustrated in FIG. 3 against the force of the compression spring 80, the second land 70 of the valve spool 66 is located between the second fluid inlet port 44 and the fluid outlet port 48 and at the same time the third land 72 of the valve spool 66 is moved past the second drain port 52, thereby blocking the fluid communication between the second fluid inlet port 44 and the fluid outlet port 48 by the second land 70 and providing communication between the fluid outlet port 48 and the second drain port 52 through the second circumferential groove 76 in the valve spool 66. Under these conditions, the second fluid inlet port 42 is open to the second axial bore portion groove 74 of the valve chamber 36 through the first circumferential groove 74 in the valve spool 66 so that the valve spool 66 is acted upon not only by the force F of the compression spring 80 and the throttle-valve pressure Pt entering the first axial bore portion 38 of the valve chamber 36 through the first fluid inlet port 42 but by the line pressure Pl which is developed in the first circumferential groove 74 between the first and second lands 68 and 70 of the valve spool 66. The line pressure Pl thus developed in the circumferential groove 74 acts on the respective annular end faces of the first and second lands 68 and 70 of the valve spool 66 and creates a force $(S_2 - S_1).Pl$ resulting from the line pressure Pl acting on the differential area between the lands 68 and 70. The force $S_1.Pt$ urging the valve spool 66 to stay in the second axial position thereof is therefore reinforced by the above mentioned force $(S_2 - S_1).Pl$. Such a reinforcing force is produced as soon as the second land 70 of the valve spool 66 being moved toward the second axial position is moved past the second fluid inlet port 42 and is effective to move the valve spool 66 fast and with certainty toward the end of the movement of the valve spool 66 toward the second axial position thereof against the force of the compression spring 80. The differential area and the first circumferential groove 74 between the first and second lands 68 and 70 of the valve spool 66 constitute in combination the previously mentioned third biasing means. It is preferable that the relationship between the diameters of the lands 68, 70 and 72 of the valve spool 66 and the force F of the preloaded compression spring 80 be further selected in such a manner that the force $(S_2 - S_1).Pl$ resulting from the line pressure Pl thus acting on the differential area between the lands 68 and 70 is greater than the force F of the spring 80 so that the force F of the spring 80 can be overcome easily and with certainty by the sum of the force $S_1.Pt$ and the force $(S_2 - S_1).Pl$ when the valve spool 66 is being moved from the first axial position toward the second axial position thereof even under such a condition that the throttle-valve pressure Pt is sizeably reduced during deceleration of the vehicle.

When the valve spoon 66 is moved into the second axial position thereof with the result that the fluid outlet port 48 is isolated from the second fluid inlet port 44 and is brought into communication with the second drain port 52 through the second circumferential groove 76 in the valve spool 66 as shown in FIG. 2, the line-pressure fluid in the passageway 56 is prevented from being passed to the shift valves 62 and the fluid which has been admitted into the fluid outlet port 48 is directed to the sump (not shown) through the second drain port 52. The shift valves 62 are therefore cleared of the biasing forces urging the shift valves toward the downshift positions. The shift valves 62 are thus operated on the basis of the line pressure, throttle-valve pressure and governor-valve pressure independently of the downshift valve unit 30. FIG. 4 illustrates examples of the transmission gear shift patterns between first and second transmission gear positions (each indicated by numerals 1 and 2 with an arrow interposed therebetween) and second and third transmission gear positions (each indicated by numerals 2 and 3 with an arrow interposed therebetween), using vehicle speeds as abscissas and opening degrees of the carburetor throttle valve 22 as ordinate. Roman numerals I, II and III indicate ranges in which the first, second and third gear positions, respectively, are established in the automatic drive range (D) of the power transmission. Furthermore, the abbreviation KD stands for kickdown condition in which the throttle valve 22 of the carburetor 20 is fully open to establish full throttle condition in the engine.

FIG. 5 is a diagram similar to FIG. 4 but shows examples of the transmission gear shift patterns achieved when the downshift valves 62 are biased toward the downshift positions by the line pressure Pl passed through the downshift valve unit 30 actuated into the condition illustrated in FIG. 2. When the brake pedal 28 is once depressed to produce a sudden deceleration condition and is thereafter released, the vehicle speed and accordingly the throttle-valve pressure Pt are maintained at relatively low levels for some time after the brake pedal 28 has been released. Under these conditions, the force $S_1 \cdot Pt$ resulting the throttle-valve pressure Pt at such a level is smaller than the biasing force F of the preloaded compression spring 80. The valve spool 66 is therefore maintained in the first axial position as long as the power output of the engine is smaller than a certain value and accordingly the throttle-valve pressure Pt is lower than a predetermined level corresponding to such a value of the engine power output. The transmission shift valves 62 are accordingly maintained biased toward the downshift positions thereof, as indicated by full line a–b and a'–b' of the plots shown in FIG. 5, in which the opening degree of the carburetor throttle valve corresponding to the above mentioned predetermined level of the throttle-valve pressure Pt is indicated by H. When the accelerator pedal 26 is partially depressed or first fully depressed and thereafter released or partially moved back under such conditions for producing an increase in the power output of the engine, the throttle-valve pressure Pt is increased and accordingly the force $S_1 \cdot Pt$ acting on the valve spool 66 is made to increase. When the throttle-valve pressure Pt thus reaches the above mentioned predetermined level which corresponds to the opening degree H of the carburetor throttle valve, the force $S_1 \cdot Pt$ exerted on the valve spool 66 becomes effective to initiate the valve spool 66 into motion to move away from the first axial position toward the second axial position thereof against the opposing force of the compression spring 80. As the valve spool 66 advances toward the second axial position thereof, the second land 70 of the valve spool 66 is moved past the second fluid inlet port 42 and allows entry of the line pressure Pl into the first circumferential groove 74 in the valve spool 66 through the second fluid inlet port 42. The movement of the valve spool 66 toward the second axial position thereof as initiated by the force $S_1 \cdot Pt$ alone is accelerated by the additional force $(S_2 - S_1) \cdot Pl$ resulting from the line pressure Pl acting on the differential area between the first and second lands 68 and 70 of the valve spool 66.

From the foregoing description it will have been appreciated that the downshift control apparatus proposed by the present invention provides various outstanding advantages major ones of which are as follows:

(1) The valve spool 66 can be forcefully and reliably moved between the first and second axial positions thereof and held in any of these axial positions by forces which are positively applied thereto from the fluid pressures developed in the first, second and third fluid inlet ports 42, 44 and 46 and the preloaded compression spring 80 so that transmission gear shift valves are prevented from being erroneously or unduely operated even when the downshift valve unit 30 is subjected to shocks and vibrations tending to irregularly or unduly move the valve spool 66 within the valve chamber 36.

(2) The solenoid-operated valve unit 32 constituting the servo means for the valve unit 30 merely suffices to be capable of resisting the force resulting from the line pressure developed in the aperture 64 in the wall portion 34a of the valve casing 34 and, for this reason, can be constructed to have a small capacity and accordingly a small-sized configuration.

(3) The level of the throttle-valve pressure at which the downshift condition maintained after sudden deceleration of the vehicle can be readily and accurately adjusted by selecting the force of the preloaded compression spring 80.

(4) Only one unitary valve element is used to provide saving of costs for the manufacture and maintenance and of spaces in the hydraulic control system.

(5) The servo means which has been assumed to be constituted by the solenoid-operated valve actuator 32 may be constituted by any other mechanically and/or electrically operated means responsive to kickdown and sudden deceleration conditions of the vehicle and may be located as desired with respect to the downshift valve unit 30, because of the fact that the function required of the servo means is merely to close the aperture 64 constituting orifice in response to such conditions. This will provide ease of designing the hydraulic control system as a whole.

What is claimed is:

1. In an automotive vehicle having engine power output control means capable of producing a kickdown condition, braking means capable of producing a sudden deceleration condition of the vehicle and an automatic power transmission including a hydraulic control system which includes a source of control fluid pressure and at least one transmission gear shift lever having an upshift position and a downshift position, a downshift control apparatus for biasing said shift valve toward the downshift position thereof during a kickdown condition or a sudden deceleration condition of the vehicle, the downshift control apparatus comprising, downshift valve means intervening between said source of the control fluid pressure and said shift valve and having a first condition operative to pass the control fluid pressure therethrough to the shift valve for urging the shift valve toward the downshift position thereof and a second condition operative to discharge the control fluid pressure from the shift valve through the valve means, first biasing means constantly urging the downshift valve means toward the first condition thereof with a substantially constant force, second biasing means responsive to the variation in the power output of the engine for urging said downshift valve means toward the second condition thereof with a force continuously variable with the engine power output, third biasing means operative to urge said downshift valve means toward the second condition thereof when the valve means is out of the first condition thereof, and servo means responsive to a kickdown condition or a sudden deceleration condition of the vehicle for driving, jointly with the force exerted on said valve means by said first biasing means, the downshift valve means out of said second condition into said first condition thereof against the forces exerted on the valve means by said second and third biasing means.

2. A downshift control apparatus as set forth in claim 1, in which said servo means is operative to produce a hydraulic power output acting on said valve means in response to a kickdown condition or a sudden deceleration condition of the vehicle.

3. A downshift control apparatus as set forth in claim 1, in which the sum of the force exerted on said downshift valve means by said first biasing means and the force to result from said hydraulic power output of said servo means is greater than the sum of the forces to be exerted on the valve means by said second biasing means and said third biasing means.

4. A downshift control apparatus as set forth in claim 3, in which the force exerted on said downshift valve means by said first biasing means is smaller than the force to be exerted on the valve means by said third biasing means.

5. A downshift control apparatus as set forth in claim 1, in which said servo means comprises a fluid circuit having a first condition to develop a fluid pressure as said hydraulic power output of the servo means and a second condition to discharge the fluid pressure from said fluid circuit and a solenoid-operated actuator for actuating said fluid circuit into said first condition thereof in response to a kickdown condition or a sudden deceleration condition of the vehicle.

6. A downshift control apparatus as set forth in claim 5, in which said fluid circuit comprises a flow restriction in constant communication with said source of the control fluid pressure and a fluid discharge port in constant communication with said source through said flow restriction and larger in open cross-sectional area than said flow restriction, said solenoid-operated actuator being operative to close said fluid discharge port for developing said fluid pressure as said hydraulic power output of the servo means and in response to a kickdown condition or a sudden deceleration condition of the vehicle to allow said fluid discharge port to open for discharging the fluid pressure from said fluid circuit through said fluid discharge port in the absence of a kickdown condition and a sudden deceleration condition of the vehicle.

7. A downshift control apparatus as set forth in claim 6, in which said servo means further comprises switch means electrically connected to said solenoid-operated actuator and mechanically connected to said engine power output control means and said braking means for being responsive to a kickdown condition and a sudden deceleration condition of the vehicle.

8. In an automotive vehicle having engine power output control means capable of producing a kickdown condition, braking means capable of producing a sudden deceleration condition of the vehicle and an automatic power transmission including a hydraulic control system which includes a source of line pressure, an engine-output responsive valve responsive to the operational condition of said engine power output control means and at least one transmission gear shift valve having an upshift position and a downshift position, a downshift control apparatus for biasing the shift valve toward the downshift position thereof during a kickdown condition or a sudden deceleration condition of the vehicle, the downshift control apparatus comprising;

downshift valve means intervening between said source of the line pressure and said shift valve and having a first condition operative to pass the line pressure therethrough to said shift valve for urging the shift valve toward said downshift position thereof and a second condition operative to discharge the line pressure from the shift valve through said valve means, first biasing means urging the downshift valve means toward said first condition by a substantially constant force, second biasing means responsive to said throttle-valve pressure delivered from said engine-output responsive valve for urging said downshift valve means toward the second condition thereof, third biasing means responsive to said line pressure and operative to urge said downshift valve means toward the second condition thereof when the valve means is out of the first condition thereof, and servo means responsive to a kickdown condition and a sudden deceleration condition of the vehicle for producing a hydraulic power output which is effective, jointly with the force exerted on said valve means by said first biasing means, to drive the downshift valve means out of the second condition into the first condition thereof against the forces exerted on the valve means by said second and third biasing means in response to a kickdown condition or a sudden deceleration condition of the vehicle.

9. A downshift control apparatus as set forth in claim 8, in which said downshift valve means comprises a valve casing formed with a valve chamber and a valve spool having a differential pressure-acting area and axially movable in said valve chamber between a first axial position providing said first condition of the valve means and a second axial position providing said second condition of the valve means, and in which said first biasing means comprises an elastic biasing element engaging said valve spool and mechanically pressing the valve spool toward said first axial position thereof, said valve chamber being further formed with a first fluid inlet port communicating with said engine-output responsive valve for developing said throttle-valve pressure in the port, the throttle-valve pressure in the first inlet port urging said valve spool toward said second axial position thereof, a second fluid inlet port communicating with said source of the line pressure for developing the line pressure in the second fluid inlet port, the line pressure in the second fluid inlet port acting on said differential pressure-acting area of said valve spool for urging the valve spool toward the second axial position thereof when the valve spool is out of the first axial position thereof, a third fluid inlet port communicating with the source of the line pressure through a flow restriction, a fluid outlet port communicating with said shift valve and communicable with said second fluid inlet port through a portion of said valve chamber for developing the line pressure in the fluid outlet port when said valve spool is in said first axial position thereof, a drain port communicable with said fluid outlet port through a portion of said valve chamber for discharging the line pressure from the fluid outlet port through the drain port when said valve spool is in said second axial position the drain port when said valve spool is in said second axial position thereof, and a fluid discharge port communicating with said third fluid inlet port through a portion of said valve chamber and larger in open cross-sectional area than said flow restriction, the line pressure directed into the third fluid inlet port being discharged through said discharge port when the discharge port is open and producing said hydraulic power output for urging said valve spool toward said first axial position thereof when the discharge port is closed, said second biasing means comprising said first fluid inlet port, said third biasing means comprising said second fluid inlet port, and said servo means comprising said third fluid inlet port, said flow restriction and said fluid discharge port.

10. A downshift control apparatus as set forth in claim 9, in which said servo means further comprises a solenoid-operated actuator operative to close said fluid discharge port in response to a kickdown condition or a sudden deceleration condition of the vehicle and to allow the fluid discharge port to open in the absence of a kickdown condition and a sudden deceleration condition of the vehicle.

11. A downshift control apparatus as set forth in claim 10, in which said servo means further comprises switch means electrically connected to said solenoid-operated actuator and mechanically connected to said engine power output control means and said braking means for being responsive to kickdown condition and a sudden deceleration condition of the vehicle.

12. A downshift control apparatus as set forth in claim 10, in which said valve chamber consists of a first bore portion open at one axial end to said first fluid inlet port and a second bore portion open at one end to said third fluid inlet port and to said fluid discharge port and larger in cross sectional area than the first bore portion and in which said valve spool has a first land axially movable in said first bore portion and second and third lands axially movable in said second bore portion and having substantially equal cross sectional areas, the first and second lands being axially spaced apart from each other for forming a first groove therebetween and the second and third lands being axially spaced apart from each other for forming a second groove therebetween, the first land having a cross sectional area smaller than the cross sectional areas of the second and third lands for forming said differential pressure-acting area between the first and second lands, said first groove being located to be isolated from said second fluid inlet port when the valve spool is in the first position axial thereof and to be open to the second fluid inlet for causing the line pressure in the second fluid inlet port to act on said differential pressure-acting area through the first groove when the valve spool is in the second axial position thereof, said second groove being located to be open to both the second fluid inlet port and said fluid outlet port for providing communication therebetween when the valve spool is in the first axial position thereof and to be open to both the fluid outlet port and said drain port for providing communication therebetween when the valve spool is in the second axial position thereof.

13. A downshift control apparatus as set forth in claim 12, in which said elastic biasing element and the cross sectional areas of the first and second lands of said valve spool are selected so that the force of the biasing element is smaller than the force to result from the line pressure to act on said differential area between said first and second lands.

* * * * *